(12) United States Patent
Kimball

(10) Patent No.: US 7,307,915 B2
(45) Date of Patent: Dec. 11, 2007

(54) SEISMIC MODEM

(75) Inventor: Steven F Kimball, Auburn, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 40 days.

(21) Appl. No.: 11/371,560

(22) Filed: Mar. 9, 2006

(65) Prior Publication Data

US 2007/0223313 A1 Sep. 27, 2007

(51) Int. Cl.
    H04B 11/00 (2006.01)
(52) U.S. Cl. ..................................... 367/134
(58) Field of Classification Search ............... 367/134, 367/140, 76
    See application file for complete search history.

(56) References Cited

U.S. PATENT DOCUMENTS

| | | | |
|---|---|---|---|
| 2,898,084 A | | 8/1959 | Eckel et al. |
| 3,106,982 A | | 10/1963 | Wade |
| 3,273,112 A | * | 9/1966 | Hobson ..................... 367/134 |
| 3,302,746 A | | 2/1967 | Ikrath |
| 3,715,664 A | * | 2/1973 | Ikrath ......................... 455/22 |
| 3,940,733 A | | 2/1976 | Johnson et al. |
| 4,326,262 A | | 4/1982 | Clement |
| 5,469,403 A | * | 11/1995 | Young et al. ............... 367/134 |
| 6,002,640 A | | 12/1999 | Harmon |
| 6,584,406 B1 | | 6/2003 | Harmon et al. |
| 6,704,376 B2 | | 3/2004 | Mills et al. |
| 6,885,918 B2 | | 4/2005 | Harmon et al. |
| 6,928,030 B2 | | 8/2005 | Chamberlain et al. |
| 6,947,505 B2 | | 9/2005 | Learned |
| 2002/0037737 A1 | | 3/2002 | Learned et al. |
| 2003/0158877 A1 | | 8/2003 | Chatterjee |
| 2003/0218936 A1 | | 11/2003 | Chamberlain |
| 2004/0006430 A1 | | 1/2004 | Harmon et al. |
| 2004/0105341 A1 | | 6/2004 | Chamberlain et al. |
| 2005/0047275 A1 | | 3/2005 | Chamberlain et al. |
| 2005/0047277 A1 | | 3/2005 | Chamberlain et al. |
| 2005/0197781 A1 | | 9/2005 | Harmon et al. |
| 2005/0289205 A1 | | 12/2005 | Chatterjee |

FOREIGN PATENT DOCUMENTS

| EP | 1247118 B1 | 4/2005 |
|---|---|---|
| WO | WO 98/52072 | 11/1998 |
| WO | WO 03/063351 A2 | 7/2003 |
| WO | WO 2004/068169 A1 | 8/2004 |

OTHER PUBLICATIONS

Ikrath et al., "New Transducers for Communicating by Seismic Waves", Electronics, pp. 51-55, Apr. 12, 1963.*

* cited by examiner

Primary Examiner—Ian J. Lobo
(74) Attorney, Agent, or Firm—Vern Maine & Associates

(57) ABSTRACT

A system for the transmission of data by seismic wave, the system having at least one transmitting unit, that at least one transmitting unit comprising a first processing unit encoding a first signal, the first processing unit being coupled to a digital to analog converter, an amplifier amplifying the first signal, and a seismic pressure wave inducer transmitting the first signal to a geological feature; and at least one receiving unit, the receiving unit comprising at least one receiver coupled to the geological feature for receiving the first signal, and an analog to digital converter whereby the first signal is transferred from the geophone and is conveyed to a second processing unit, the second processing unit being configured to identify and decode the first signal.

18 Claims, 8 Drawing Sheets

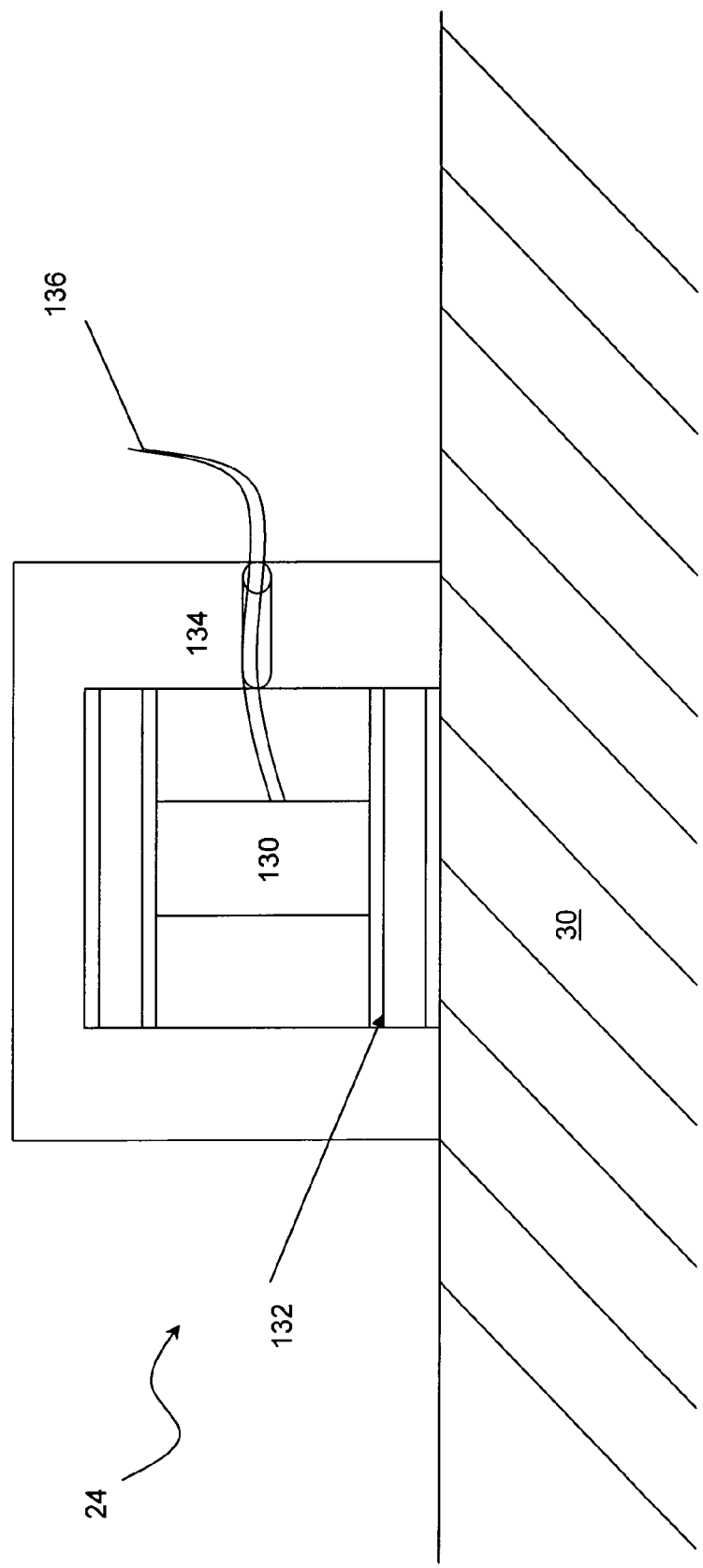

SEISMIC MODEM

FIELD OF THE INVENTION

The invention relates to data communications, and more particularly, to a data communications channel using seismic pressure waves.

BACKGROUND OF THE INVENTION

Often instruments and sensors are placed in locations where radio communications are impossible or impractical. Cave walls, walls of narrow gorges and other geological features may block radio transmissions which might otherwise be used to monitor or communicate with such instruments. Known techniques for monitoring such instruments require installation of cables. Often, the physical location of the instruments means that cables to such instruments must be long. Such installations are awkward and time consuming. Such long cables are vulnerable to damage.

In some fields, especially in energy prospecting, seismic charges and waves have been used to communicate information. These techniques often rely on time intervals between nearly identical seismic shots, in essence, these techniques are analogous to Morse Code, where the timing of separate signals conveys information. Other such techniques rely not on true seismic transmission of signals, but instead on the transmission through fluids, like slurry or water.

What is needed, therefore, are techniques for wirelessly communicating data through geological barriers.

SUMMARY OF THE INVENTION

One embodiment of the present invention provides a system for the transmission of data by seismic wave, that system comprising: at least one transmitting unit, that at least one transmitting unit comprising a first processing unit encoding a first signal, the first processing unit being coupled to a digital to analog converter, an amplifier amplifying the first signal, and a seismic pressure wave inducer transmitting the first signal to a geological feature; and at least one receiving unit, the receiving unit comprising at least one receiver coupled to the geological feature for receiving the first signal, and an analog to digital converter whereby the first signal is transferred from the geophone and is conveyed to a second processing unit, the second processing unit being configured to identify and decode the first signal.

Another embodiment of the present invention provides such a system wherein the transmitting unit further comprises at least one receiver for receiving a second signal, an analog to digital converter coupled to the first processor, whereby the second signal is identified and decoded.

A further embodiment of the present invention provides such a system wherein the receiver comprises a receiver selected from the group of receivers consisting of geophones and microphones.

Yet another embodiment of the present invention provides such a system wherein the receiving unit further comprises a multi-user detection capability.

A yet further embodiment of the present invention provides such a system wherein the seismic pressure wave inducer is a transceiver.

Still another embodiment of the present invention provides such a system wherein the transceiver is a transceiver selected from the group of transceivers consisting of piezoelectric crystals, piezoceramic elements, and electric induction motors.

A still further embodiment of the present invention provides such a system wherein the transceiver is disposed in an item of footwear.

Even another embodiment of the present invention provides such a system further comprising mechanical fasteners whereby the seismic pressure wave inducer is held in contact with a rigid transmission medium such as a geological feature or concrete slab.

One embodiment of the present invention provides a method for transmitting information via seismic waves, the method comprising: encoding the information; amplifying the information; inducing seismic waves carrying the information; receiving the seismic waves; decoding the information.

Another embodiment of the present invention provides such a method wherein the information comprises a test sequence.

A further embodiment of the present invention provides such a method further comprising estimating parameters by parameter estimation of the seismic waves.

Yet another embodiment of the present invention provides such a method wherein the information comprises a handshake protocol.

A yet further embodiment of the present invention provides such a method further comprising placing an inducer in contact with a rigid substrate; the inducer being configured to induce the seismic waves through the rigid substrate.

Still another embodiment of the present invention provides such a method further comprising applying a pressure to the inducer thereby maintaining contact between the inducer and the substrate.

A still further embodiment of the present invention provides such a method further comprising wearing the inducer on a user's body.

One embodiment of the present invention provides an apparatus for communication by seismic waves, the apparatus comprising: a signal encoding and generating component, whereby information is encoded into a signal and the signal is amplified, an inducer whereby the signal is transmitted as seismic waves; a receiver whereby the seismic waves are received; and a parameter estimation processor whereby the signal is discerned.

Another embodiment of the present invention provides such an apparatus wherein the inducer is a transceiver.

A further embodiment of the present invention provides such an apparatus wherein the transceiver comprises transceiver selected from the group of transceivers consisting of piezoelectric crystals, piezoceramic elements, and electric induction motors.

Yet another embodiment of the present invention provides such an apparatus further comprising a multiuser detection processor.

A yet further embodiment of the present invention provides such an apparatus further comprising at least one anchor whereby the inducer is held in contact with a transmission substrate.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 7 is a block diagram illustrating seismic transmitter configured in accordance with one embodiment of the present invention.

DETAILED DESCRIPTION

Figure 1:
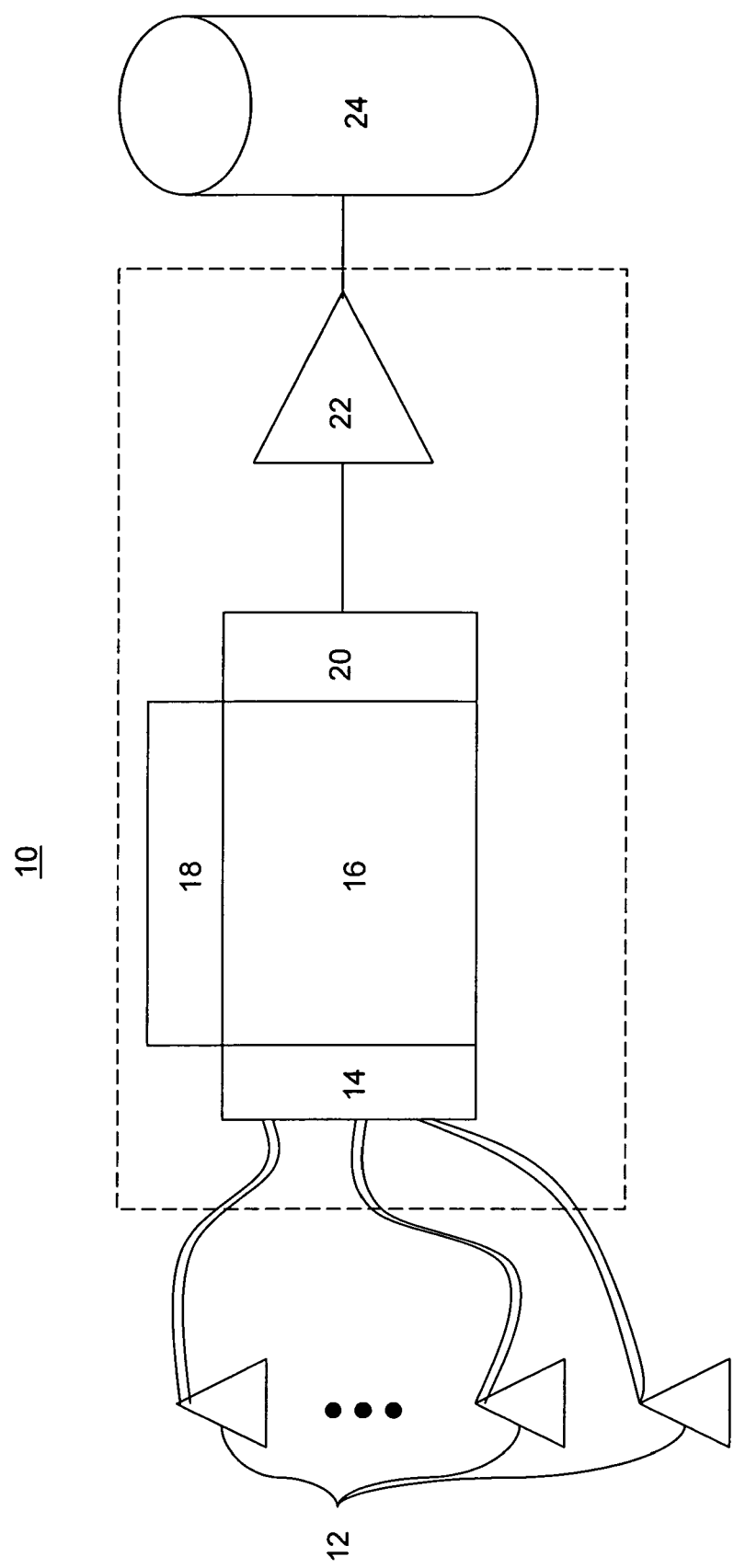
FIG. 1 is a block diagram illustrating a seismic modem configured in accordance with one embodiment of the present invention.

In one embodiment of the present invention, illustrated in FIG. 1, a seismic modem 10 is provided, comprising at least one geophone 12, coupled, via an A/D converter 14, to a processor 16 having an instrument interface 18, which is in turn coupled via a D/A converter 20 to an amplifier 22 communicating with a seismic inducer 24. In some embodiments one or more geophones may be provided forming an array of geophones. One skilled in the art will readily appreciate that microphones may be used in place of geophones 12, affording a broader frequency spectrum.

Figure 3:
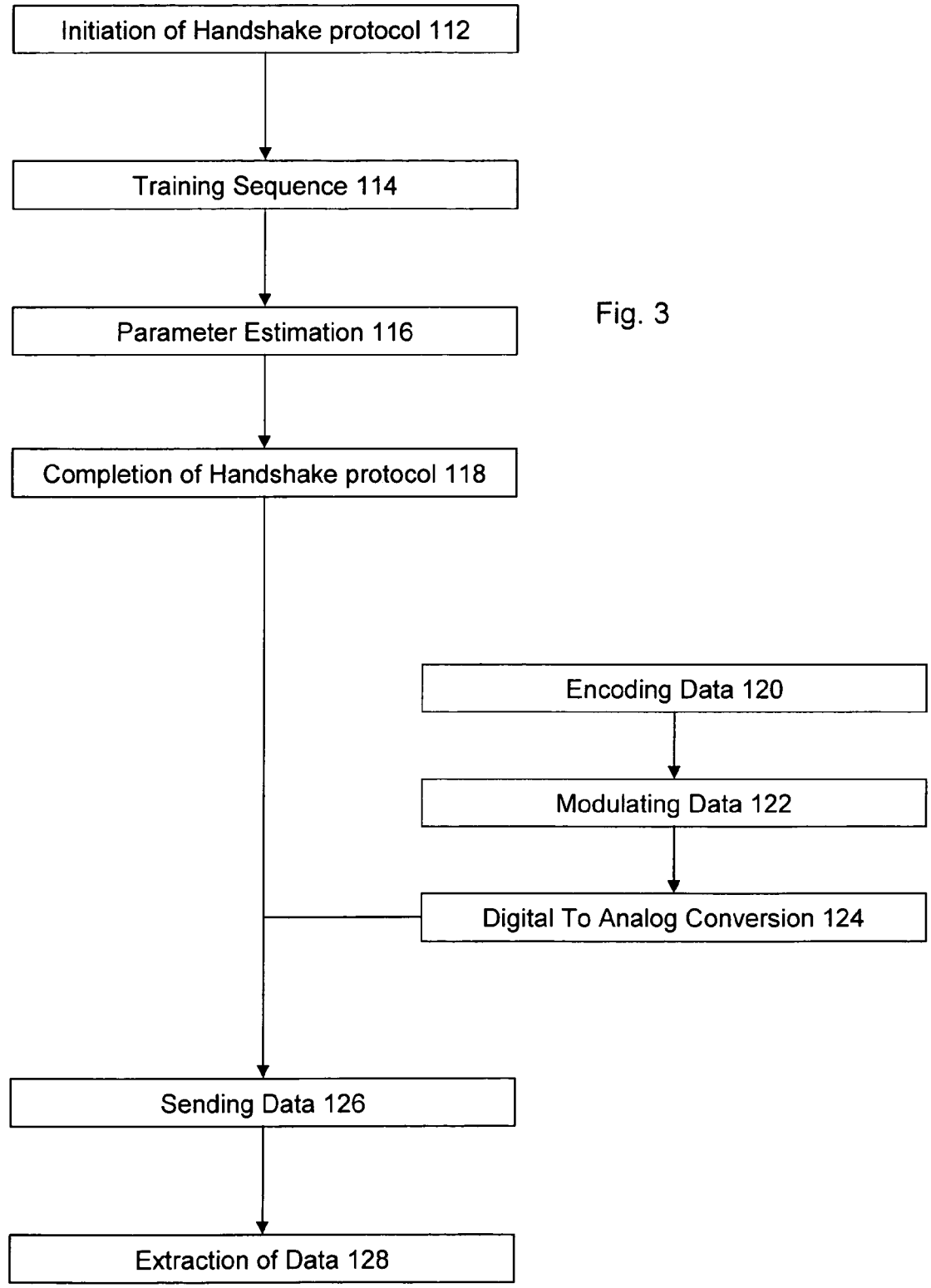
FIG. 3 is a flow chart illustrating a seismic communication technique configured in accordance with one embodiment of the present invention.

The modem of FIG. 1, in one embodiment operates according to the method illustrated in the flow chart of FIG. 3. Data is received by the modem 10 from a machine or a user through an interface 18. The received data is encoded and modulated by a processor 16, and passed through a D/A (Digital to analog) converter 20. The analog signal is amplified by the amplifier 22 and passed to the wave inducer 24 which then converts the electrical energy to mechanical energy directed to surface of the geologic feature. The mechanical energy so directed causes a pressure wave to pass through the geological feature. This wave travels through the rock and is received by a geophone 12 forming part of a corresponding modem. The analog signal received by the geophone is then sampled by an A/D converter 14 (analog to digital) and passed to the processor 16 which demodulates the signal, decodes the data and passes it through to the instrument interface 18.

Filtering may also be incorporated in to the front end of the receiving side of the modem. Filtering is well known in the art and can be used to suppress noise or other unwanted signals. Filtering techniques such as High Pass Filter (HPF), Low Pass Filter (LPF), and Band Pass Filter techniques may be employed.

In one embodiment of the present invention, the receiving modem is equipped with parameter estimation and multi user detection functions. These features are well described in other contexts in other patents and applications, notably US Published Application No. 2002/0037737, which is herein incorporated by reference. While theoretically signals transmitted through a uniform medium will be received as a uniform signal, the crust of the earth and other seismic transmittal media, like concrete slabs (such as those forming the floors of parking garages or warehouses) are not typically uniform, but are inconsistent in density, composition and may be fractured. Such variations in the transmission media, distort parts of the wave as it passes through the media. As the wave is transmitted in all directions, the receiving modem may receive the reflections, refractions, and deflections of the wave traveling at different speeds, and arriving at different times, than the primary wave. Parameter estimation and multi user detection functionalities allow the receiving modem to discriminate between the reflections, allowing for the identification of the wave, and the decoding of the information. These functions also facilitate filtering of seismic noise resulting from such divergent sources as vehicle traffic, pedestrian traffic, seismic activity. The interactions of the multi user detection and parameter estimation functions with the modem are illustrated in a block diagram illustrated in FIG. 5.

In the one embodiment illustrated in FIG. 3, a handshake protocol is initiated 112 by a modem and is responded to by at least another modem. One skilled in the art will appreciate that in embodiments where mono-directional communication are employed this step is eliminated. A training sequence or test sequence 114 is then transmitted from one of the modems and is used by the second modem in its parameter estimation protocol. From variations in the frequency, wavelength, phase and power between the test signal received and the expected value of such parameters, the receiving modem is enabled to discern the signal intended to be sent and distinguish it from noise, other signals, and reflections, distortions, and echoes of the true signal. In some embodiments additional test signals and parameter estimation steps may be undertaken to periodically update the estimation. Once such initial steps are undertaken, the communication of actual data commences or recommences. Data is encoded 120, and modulated 122 and converted from digital information to analog 124. The analog data may then be transmitted to the geological formation 126, effectively broadcasting the data through the geological formation and allowing it to be received by the other modem, which then extracts the data 128, applying the results of the parameter estimation 116.

Figure 5:
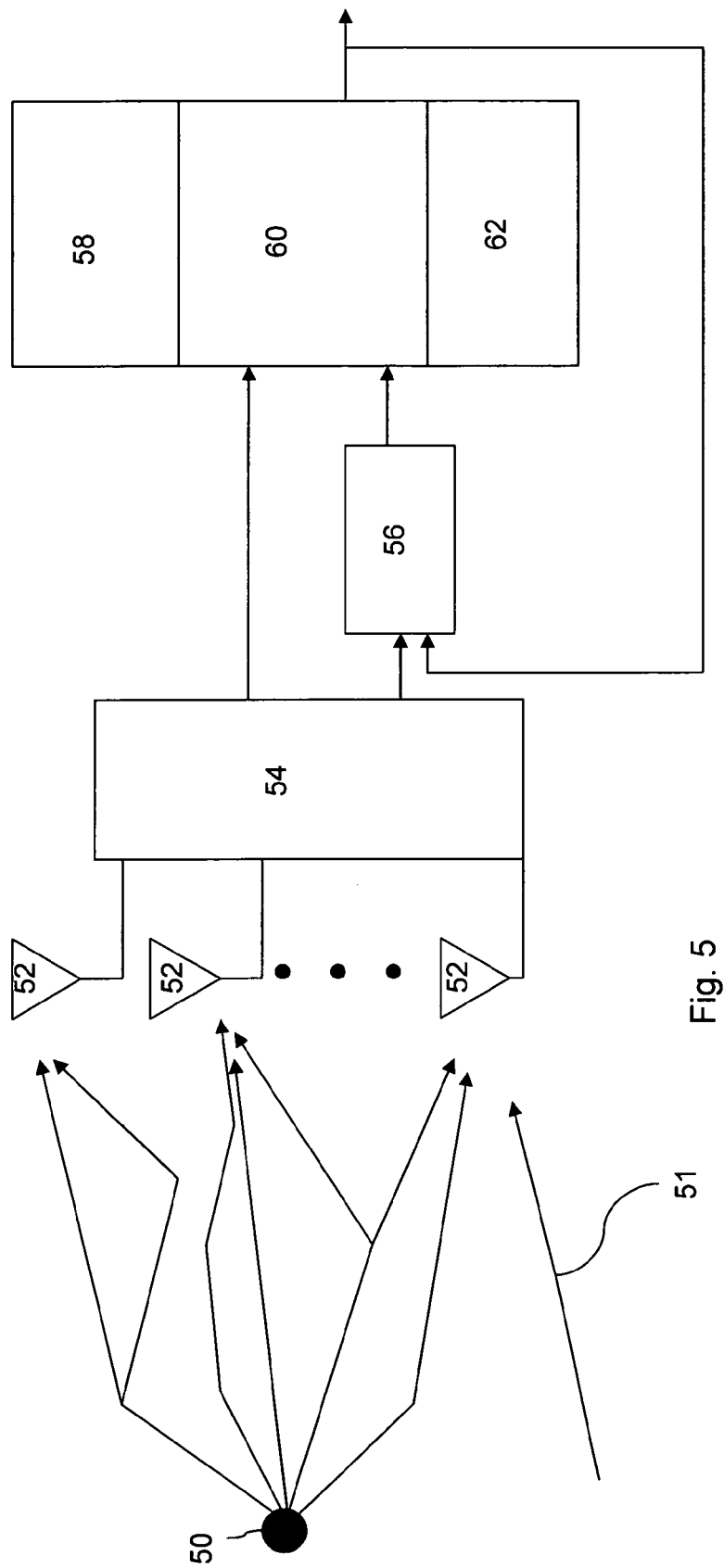
FIG. 5 is a block diagram illustrating a seismic modem having parameter estimation functionalities configured in accordance with one embodiment of the present invention.

As illustrated in the block diagram of FIG. 5, signals from a source 50 are received in distorted and refracted condition by one or more geophones or microphones 52 connected to a front end 54. The front end 54 may comprise analog to digital converters, signal amplifiers, filters, and such other electronics. The signal is then passed from the front end 54 either to the parameter estimation function 56 or the multi-user detection function 60. The parameter estimation function 56 provides the multi user detection function 60 with information necessary to discern the correct signal from the various received signals, reflections and the noise 51. Error Correction decoding 62 and preprocessors 58 may also be employed in this process. The signal is then output to a processor.

Figure 4:
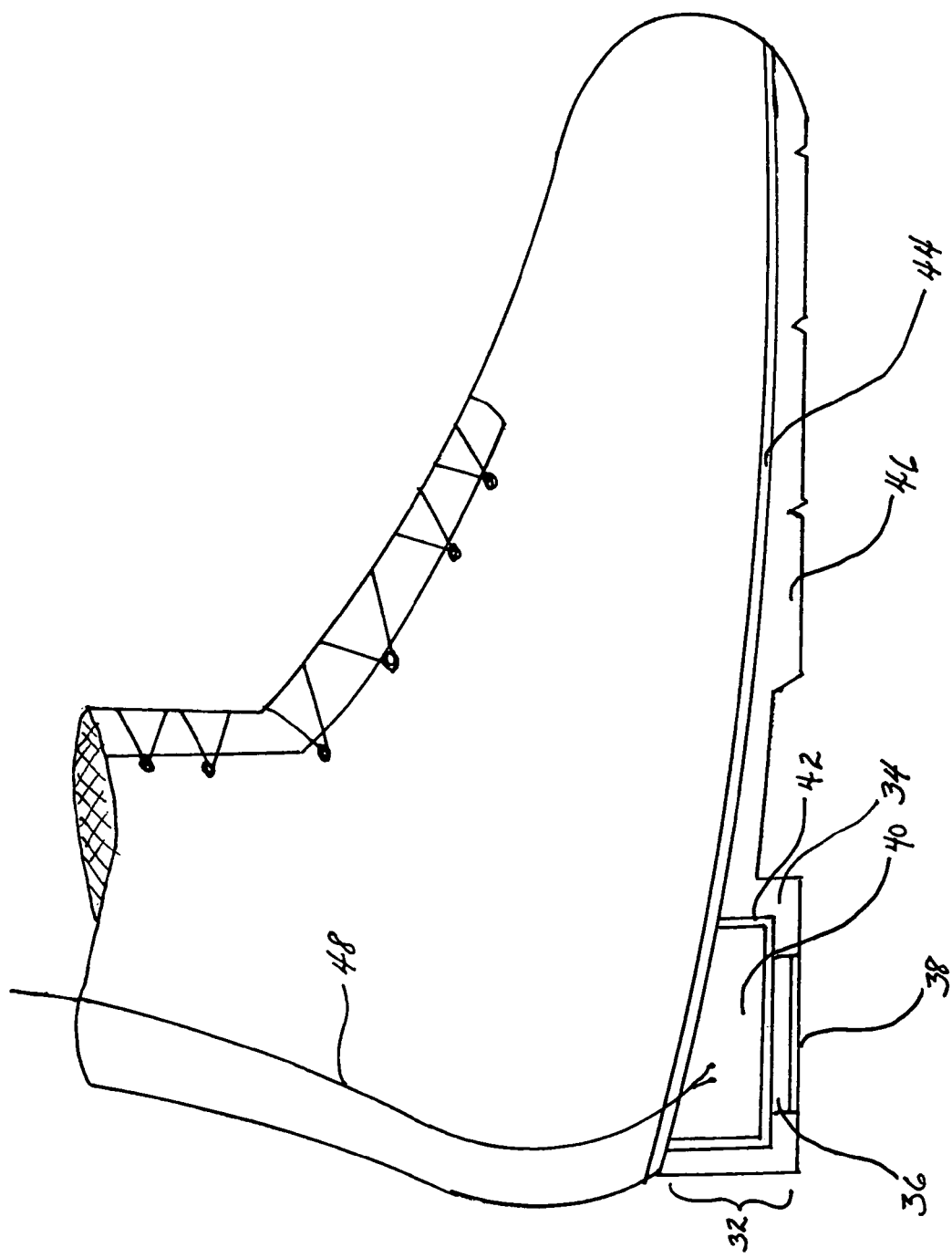
FIG. 4 is a block diagram illustrating a foot mounted seismic modem configured in accordance with one embodiment of the present invention.

In some embodiments, such as those illustrated in FIGS. 1 and 4, bidirectional communications are provided. In such embodiments, interaction between two modems is initiated using a modem handshake protocol. After the completion of the handshake protocol, a series of training sequences are exchanged between the modems. These training sequences are used to establish optimal channel equalization and beam forming weights in those embodiments where more than one geophone is used in an array. In one embodiment, these training sequences allow the modem to compensate for distortions in the signal by allowing the processing unit to conduct rapid parameter estimation. As a signal passing through non-uniform media will necessarily pass at different velocities, and in some instances encounter obstacles off which it might reflect, the signal, instead of being received as a single, uniform signal may be dispersed and with the same signal traveling by different paths and arriving at a plurality of different times. Parameter estimation, likewise, allows the processor to distinguish between signals and noise, and in some applications to distinguish between multiple signals using the same frequency range.

As illustrated in FIG. 7, a seismic transceiver 24, configured according to one embodiment of the present invention, is used in the following embodiments. A seismic inducer 130 is comprised of a piezoelectric crystal, piezoceramic element or electric induction motor proximate to the bottom surface of the transceiver. The seismic inducer 130 may be separated from the ground 30 by a steel cap 132, or a cap comprised by other rigid materials through which seismic waves would pass without substantial absorption. The material, composition, and components of the cap may be chosen such that its resonant frequency is near or within the frequency range used by the modems to facilitate the efficient transfer of energy from the inducer to the carrying medium. Alternatively, the seismic inducer 130 may be in direct contact with the ground. In one embodiment, the inducer 130 may be enclosed in a steel support housing 134. One skilled in the art will readily appreciate that other materials may be used as a housing, so long as those materials will not absorb the seismic waves generated by the inducer. The contact between the inducer and the support housing 134 may be constructed of materials and components such that its resonant frequency characteristics near or within the frequency range used by the modems inhibits transfer of energy from the inducer to the support housing, thereby preventing absorption of energy by the device or method used to secure the transducer to the transmitting medium. The inducer 130 may be connected to the rest of the system by means of a tether or other communications link 136.

Figure 2:
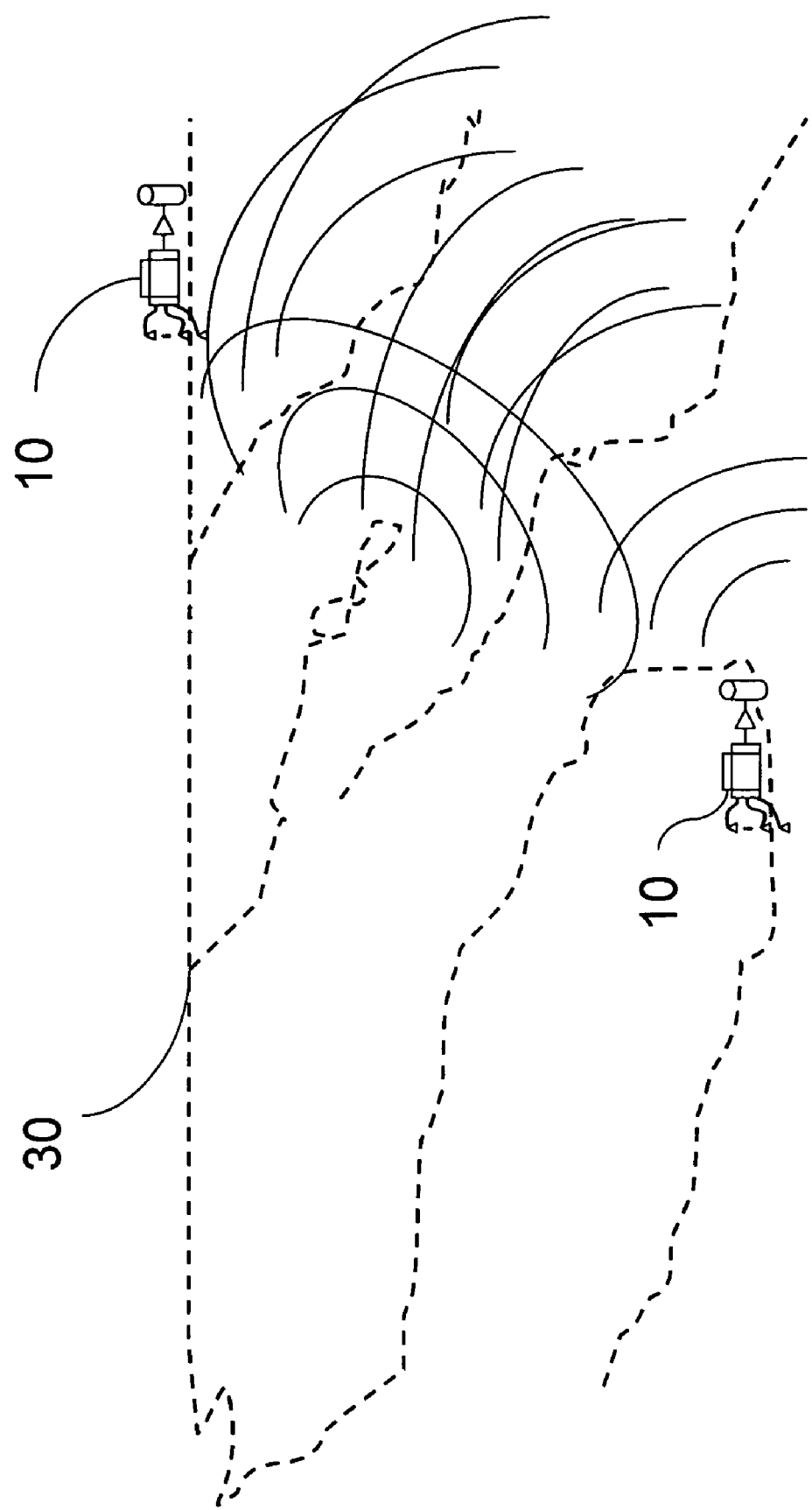
FIG. 2 is a block diagram illustrating a seismic modem system configured in accordance with one embodiment of the present invention.

As illustrated in FIG. 2, first and second modems 26, 28 are disposed on surfaces of a geological feature 30, such as a rock wall, ceiling or floor of a cave, a cliff, or a rock ledge or mountain. Alternatively, a geological feature may, for the purposes of this invention be a man made rigid structure, including but not limited to concrete floors, asphalt roads, masonry walls, or bridge spans and abutments. The inducer 24 of each modem is mounted or pressed to the feature 30 with a bias pressure greater than or equal to the peak output pressure of the inducer. In installations where a solid rock face is not available, metal rods (not shown) may be driven into the ground so as to contact obscured bedrock. The first modem 26 is connected to an instrument that is remotely monitored from the surface by an instrument coupled to the second modem 28. The first modem 26 emits seismic signals via its inducer 24 which are received by the geophones 12 of the second modem 28, which then translates those signals to a monitoring or controller processor, such as a computer. Similarly, the second modem 28 may transmit information to the first 26 which receives the signal through its geophones 12 that it then communicates to the signal to the instrument.

An alternative embodiment is illustrated in FIG. 4. In such an embodiment, a seismic transceiver 32, such as that illustrated in FIG. 7, is disposed in the heel of a boot or other item of footwear 34. Also disposed within the heel of the boot, may be placed an electronic packet 40 for controlling the piezoelectric crystal inducer 36, corresponding to the inducer 130 of FIG. 7. In one embodiment, the packet 40 may be enclosed in a steel support housing 42. One skilled in the art will readily appreciate that other materials may be used as a housing, so long as those materials will not absorb the seismic waves generated by the inducer. The support housing 42 may be integrated into reinforcing structures 44 in the sole 46 of the boot or shoe, thereby preventing absorption of seismic waves by the padding of the boot's interior and strengthening the boot itself. To use the modem, the user wears the boot. The user's weight directs the signal down into the earth. Without pressure on the transmitter, forcing the transistor transducer into contact with the ground, the device would merely force itself away from the ground, rather than transmit its signal into the ground. One embodiment may provide a power source, human machine interface, and other components too bulky to fit (not shown) in the electronic packet 40 mounted externally to the boot. In one such embodiment, a human-machine interface may be disposed proximate to the user's head to facilitate verbal communication, or may be disposed on such other areas of the user's clothing as to facilitate interface with the modem. Such components located outside of the boot may be linked to the electronics package by wire 48 or by wireless communications links.

An alternative embodiment may provide such a transceiver in a small portable package that is not integrated in to the user's shoe, but instead may be placed on the communications substrate, either bedrock, a concrete slab, or other rigid structure through which seismic waves may be directed, and held in place by pressure or weight applied to a housing surrounding the transceiver. Such pressure may be applied by the user standing on the package, mechanically fastening the package to the ground, placing rocks or other weights on the component to hold it in place. Cementitious or epoxide or other non-elastic fastening techniques may also be used. Mechanical fastening techniques may include the iron or steel tie rods described above, bolts, clamps, straps, ropes, or chains.

Figure 6A:
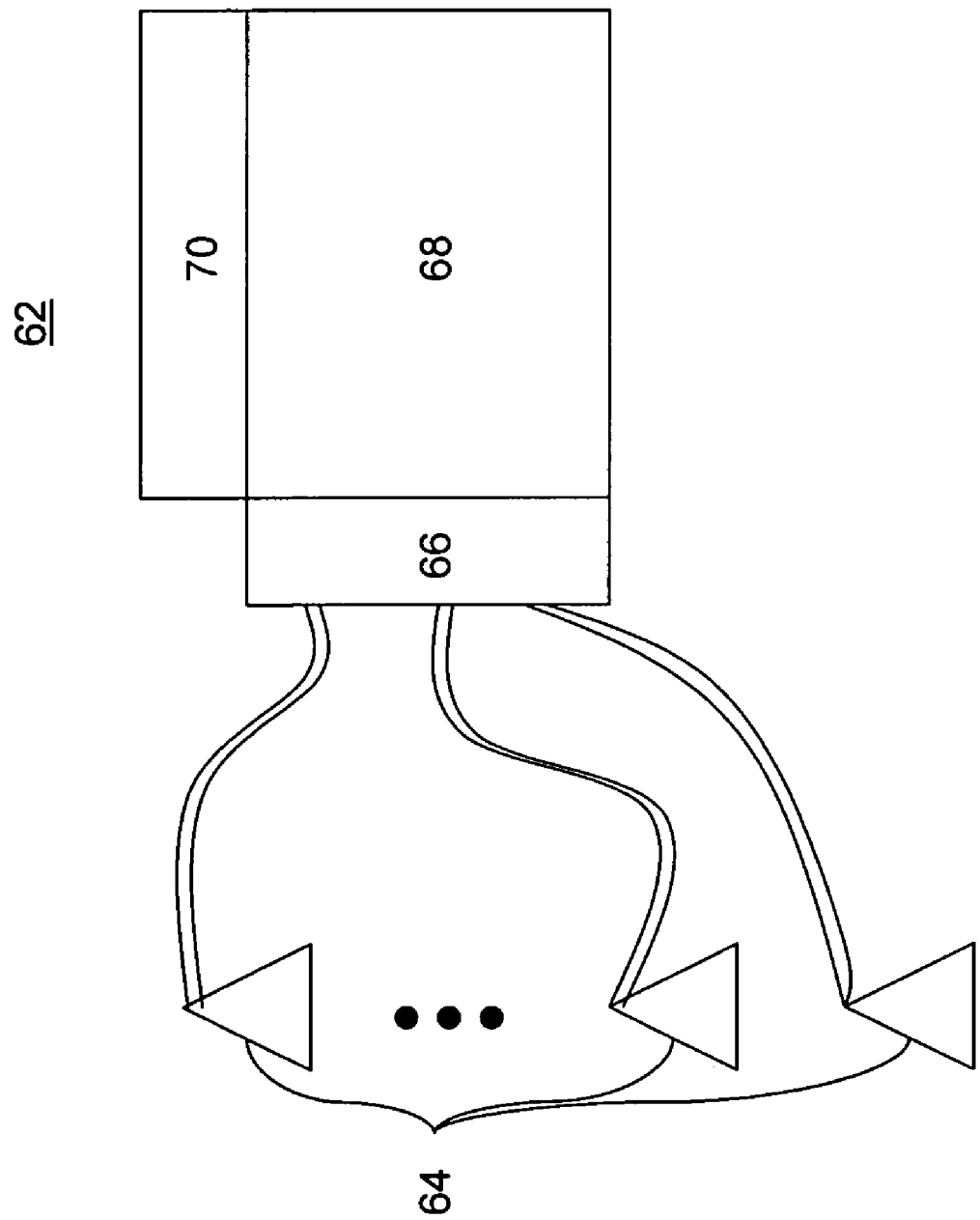
FIG. 6A is a block diagram illustrating a mono-directional seismic receiver configured in accordance with one embodiment of the present invention.
Figure 6B:
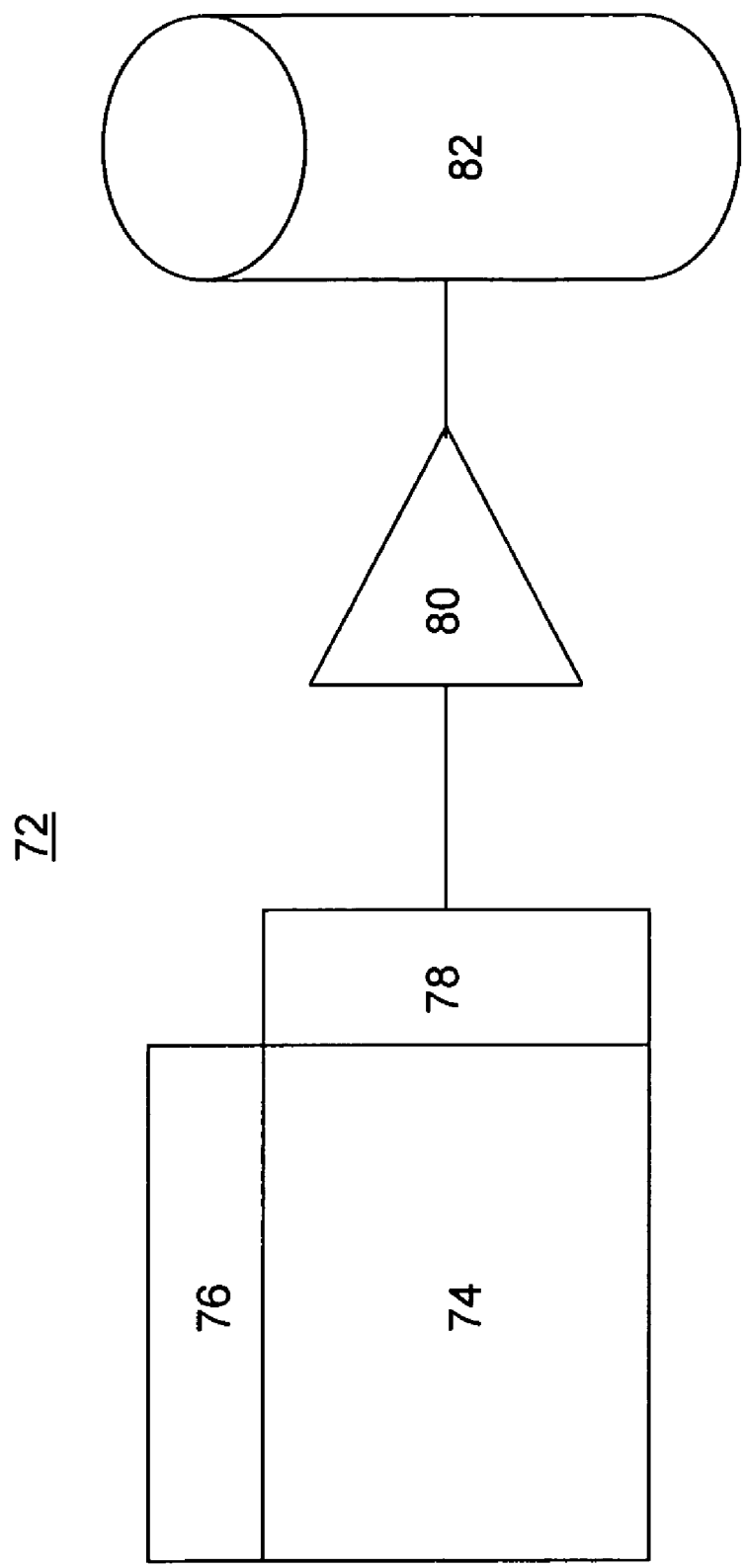
FIG. 6B is a block diagram illustrating a mono-directional seismic transmitter configured in accordance with one embodiment of the present invention.

In an alternative embodiment illustrated in FIGS. 6A and 6B a unidirectional communication system may be provided wherein a receiving component 62, illustrated in FIG. 6A, is configured having at last one geophone or microphone 64 coupled to a processing unit 68 by an analog to digital converter 66. The processing unit 66 is coupled to an interface 70 by means of which, the processor 68 communicates to the user or other equipment. A corresponding transmitter 72, illustrated in FIG. 6B comprises a processing unit 74, receiving a signal from an interface 76 is coupled by a digital to analog converter 78 to a seismic wave inducer 82. In one embodiment, a signal amplifier 80 is provided, disposed between the digital to analog converter 78 and the inducer 82. In alternative embodiments, signal amplifiers may be integrated into the receiver system 62 such that a signal is amplified prior to processing. Such a system allows for one way communication of information from the instrument to the receiving station, effectively allowing monitoring of an instrument without remote control of the instrument.

The operational steps of a unidirectional communications system comprise initiating a training sequence, encoding that training sequence in a signal, converting that signal from digital to analog, amplifying the analog signal, transmitting the signal as a pressure wave through the rock of the geologic feature. The receiving station then receives the signal in a single geophone or array of geophones, converts the signal from analog to digital, decodes and outputs the training sequence, comparing said training sequence to a known exemplar, thereby employing the training sequence to estimate the parameters of signal (such as the strength and frequency) allowing the receiving station to discriminate between noise and signals. Upon completion of the training sequence, a data from an instrument may be transmitted in the same way as the bidirectional embodiment described above.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for the transmission of data by seismic wave, the system comprising:
    at least one transmitting unit, said at least one transmitting unit comprising a first processing unit encoding a first signal, said first processing unit being coupled to a digital to analog converter, an amplifier amplifying said first signal, and a seismic pressure wave inducer transmitting said first signal to a geological feature; and
    at least one receiving unit, said receiving unit comprising at least one receiver coupled to said geological feature for receiving said first signal and a plurality of reflections and refractions, and an analog to digital converter whereby said first signal and said reflections and said refractions are conveyed to a second processing unit, said second processing unit comprising a parameter estimator and a multi-user detector for joint demodulation of said first signal, said reflections and said refractions.

2. The system of claim 1 wherein said transmitting unit further comprises at least one receiver for receiving a second signal, an analog to digital converter coupled to said first processor, whereby said second signal is identified and decoded.

3. The system according to claim 1 wherein said receiver comprises a receiver selected from the group of receivers consisting of geophones and microphones.

4. The system according to claim 1 wherein said multi-user detector comprises a parameter estimator, a pre-processor section, a multi-user detection section and an error correction decoder.

5. The system according to claim 1 wherein said seismic pressure wave inducer is a transceiver.

6. The system according to claim 5 wherein said transceiver is a transceiver selected from the group of transceivers consisting of piezoelectric crystals, piezoceramic elements, and electric induction motors.

7. The system according to claim 5 wherein said transceiver is disposed in an item of footwear.

8. The system according to claim 1 further comprising mechanical fasteners whereby said seismic pressure wave inducer is held in contact with a rigid transmission medium.

9. A method for transmitting information via seismic waves, said method comprising:
    encoding said information, said information comprises a test sequence;
    amplifying said information;
    inducing seismic waves carrying said information;
    receiving said seismic waves and reflections and refractions of said waves; and
    demodulating said waves and said reflections and refractions using multi-user detection and parameter estimation.

10. The system according to claim 9 further comprising estimating parameters of said seismic waves.

11. The system according to claim 9 wherein said information comprises a handshake protocol.

12. The method according to claim 9 further comprising placing an inducer in contact with a rigid substrate; said inducer being configured to induce said seismic waves through said rigid substrate.

13. The method according to claim 12 further comprising applying a pressure to said inducer thereby maintaining contact between said inducer and said substrate.

14. The method according to claim 12 further comprising wearing said inducer on a user's body.

15. An apparatus for communication by seismic waves, said apparatus comprising:
    a signal encoding and generating component, whereby information is encoded into a signal and said signal is amplified,
    an inducer whereby said signal is transmitted as seismic waves;
    a receiver whereby said seismic waves are received;
    a multiuser detector; and
    a parameter estimation processor;
    wherein said parameter estimation processor and said multi user detector are configured to discern between said signal and a plurality of reflections and refractions of said signal.

16. The apparatus according to claim 15 wherein said inducer is a transceiver.

17. The apparatus according to claim 16 wherein said transceiver comprises transceiver selected from the group of transceivers consisting of piezoelectric crystals, piezoceramic elements, and electric induction motors.

18. The apparatus according to claim 15 further comprising at least one anchor whereby said inducer is held in contact with a transmission substrate.

* * * * *